United States Patent Office 3,432,454
Patented Mar. 11, 1969

3,432,454
VISCOUS AQUEOUS COMPOSITIONS COMPRISING A POLYMER CONTAINING N-VINYL MORPHO-LINONE AND A POLYMER CONTAINING SULFO OR CARBOXYL GROUPS OR THEIR SALTS
Billy B. Hibbard, Midland, Mich., assignor to The Dow Chemical Company, Midland, Mich., a corporation of Delaware
No Drawing. Continuation-in-part of application Ser. No. 53,343, Sept. 1, 1960. This application Mar. 24, 1965, Ser. No. 442,479
U.S. Cl. 260—29.6            9 Claims
Int. Cl. C08f 47/16, 31/04; A61k 27/00

ABSTRACT OF THE DISCLOSURE

An intimate mixture of aqueous dispersions of a polyvinyl morpholinone and an organic polymer having recurring sulfo or carboxyl groups or their salt derivatives is of viscosity higher than the mean of the separate viscosities of the starting aqueous solutions. At very low solids content these compositions have greatly exalted viscosities in the resulting aqueous mixture which may then carry other mechanical and chemical additives of a wide range.

---

This application is an continuation-in-part of my copending application Ser. No. 53,343, filed Sept. 1, 1960, and now abandoned.

The present invention is concerned with control of the physical properties of aqueous compositions, and is more particularly directed to materials and processes for the preparation of aqueous substances of controlled viscosity.

Of all the liquid media in which substances are dispersed for the more ready achievement or distribution of mechanical, chemical, or biological activity, water is the least expensive and most common. However, when substances are dispersed in water, they usually either dissolve and form a solution of which the viscosity is essentially the same as that of water, or become suspended, temporarily or permanently, in the aqueous medium with the result that the suspension becomes essentially a mass of solid particles possessing their own properties but disposed within water of essentially unincreased viscosity. In many applications an aqueous medium is of greatly improved utility if its viscosity be simply increased. Such increase, however, must be controllable in the sense that approximately the desired degree of viscosity is established. Moreover, ideally, agents used to increase or control viscosity of fluid preparation should, themselves, be practically inert as to the desired activity of the resulting viscous preparation: that is to say, they should contribute almost nothing but viscosity and should contribute under virtually all circumstances, and the viscous products should be stable in storage.

Viscous aqueous preparations have numerous uses. For example, water alone, being rendered of high viscosity by the addition thereto of a minor amount of a viscosity increasing substance, becomes a very much more effective agent in such applications as fire-fighting. Also, such viscous inert aqueous preparation is of improved value in the shipment of plant nursery stock whereof it is desired that the roots and other parts of living plants be maintained in a moist condition throughout the period of storage and shipment, until such plants are again established in soil. Whereas water tends to be lost by flowing or dripping away and by evaporation, when the roots and other parts of plants are moistened with a heavy viscous water gel, otherwise inert or at least harmless as to the growth of the plants, they may be readily be maintained in moist condition over much longer periods of time and with much less attention than when water alone is used.

In the pharmaceutical and cosmetic fields, it is often desired to apply a pharmaceutical substance or cosmetic adjuvant as an aqueous preparation; such employment has frequently been hindered because it is impractical to build up a deposit of significant depth therefrom. However, by the employment of pharmaceutical and cosmetic substances comprising aqueous preparations together with minor amounts of viscosity-building agents, it is possible to exhibit such substances as paste, gel, and the like. In numerous industrial and technological processes, including those wherein the employment of unmoving water is especially indicated by reason of its high specific heat, the employment of thickened or viscosity-increased aqueous preparations frequently permits ready achievement of beneficial results not otherwise available.

Accordingly, it is an object of the present invention to provide means for increasing, to a desired degree, the viscosity of aqueous preparations. It is a further object of the present invention to increase the viscosity of aqueous preparations without significantly affecting utilities and properties of such aqueous preparations that arise from components other than water and the present viscosity increasing agents.

It is another object of the present invention to provide a novel and economical aqueous vehicle of which the viscosity may be varied between a viscosity almost as low as that of water and a viscosity greater that can readily be measured, that is to say, a near solid. It is a further object to provide novel aqueous pharmaceutical preparations of pre-determined viscosity up to the viscosity of firm gels, embodying pharmaceutical agents and normally liquid. It is a further object to provide novel aqueous cosmetic substances and cosmetic adjuvants of desired viscosities up to the viscosity of firm gel, of cosmetic substances and cosmetic adjuvants which are normally liquid. These and other objects will be apparent from the following specification.

According to the present invention I have discovered a controllably viscous, difficulty flowable essentially aqueous composition of which the components comprise essentially water, water-soluble poly-N-alkenyl morpholinone and a water-soluble organic polyalkenyl polymer comprising recurring moieties which are members of the group consisting of sulfo and carboxyl and the water-soluble salts thereof.

The exact chemical structure of the present viscous compositions, and whether a chemical reaction of any sort takes place in their formation, is not known. However, a preparation of the present invention is a composition resulting from the mixing together of an aqueous dispersion of a water-soluble poly-N-alkenyl morpholinone and a water soluble polyalkenyl polymer comprising recurring members of the group consisting of sulfo and carboxyl and salts thereof; the said composition being of viscosity greater than the mean of the separate viscosities of the said polymers in separate similar dispersions.

Suitable poly-N-alkenyl morpholinone substances to be employed as one of the two dissimilar components of the novel viscous materials are prepared by, for example, the direct alkenylation of the morpholinone compound with acetylene or like alkene; by converting the morpholinone to its potassium salt (as by reacting morpholinone with metallic potassium in benzene) and thereafter reacting the potassium morpholinone and further morpholinone and alkene, which may be a gaseous alkene, in an autoclave, under pressure, and at elevated temperatures, for example, at 150° C. and under 7 atmospheres pressure. However prepared, the resulting monomer may be polymerized in known manner, for example in water solution at temperatures of 50°–100° C., and, if desired, with a polymerization catalyst which may be potassium persulfate or an azobis (isobutyronitrile). Preparation of the poly-N-vinyl morpholine compounds may be carried out according to the teaching of the U.S. patent of B. E. Burgert, 2,987,509.

Polymeric substances comprising recurring acidic moieties and their derivatives of the sort described which are representative of other of the two dissimilar members of the present vehicle substances include polystyrene-p-sulfonic acid, polyvinylsulfonic acid, polyacrylic acid, sodium polyacrylate, copolymers of which a major monomeric component is maleic anhydride hydrolyzed after polymerization, polyvinylbenzoic acid and polyvinyl-substituted-benzoic acid, partially hydrolyzed polyacrylamide, a hydrolyzed copolymer of vinyl acetate and maleic anhydride, a copolymer of styrene and maleic anhydride partially hydrolyzed and thereafter neutralized with sodium hydroxide, a product prepared by the polymerization of styrene and subsequent ring sulfonation, for example, to the extent of about 70 mole percent of monomer; and copolymeric substances wherein there recur moieties derived from inclusion, in the mixture of monomers, one or more of styrenesulfonic acid, vinylsulfonic acid, acrylic acid, methacrylic acid, vinylbenzoic acid, ring-substituted vinylbenzoic acid, ethacrylic acid, and its higher homologues, and maleic anhydride and acrylamide in copolymers which are hydrolyzed subsequent to polymerization; and in each case, the salts including the alkali metal salts, ammonium salts, amine salts, and particularly the lower alkylamine and lower alkanolamine salts of the acidic substances of the sort described.

Thus one representative embodiment of the present invention is exhibited in a composition of matter comprising essentially, the product resulting from the contacting of a water solution of polymeric 3-vinylmorpholinone and a water solution of a polyalkenyl polymer upon the polymer chain of which there appear recurring moieties which are members of the group consisting of sulfo and carboxyl and the salts thereof, said composition being of greater viscosity than the mean of the separate viscosities of the said polymers in separate similar dispersion.

In one manner of carrying out the preparation of the simple viscous aqueous preparation of the present invention, stable homogeneous aqueous dispersions, which may be solutions, of each of the two said kinds of polymers are first prepared. In this connection it is noted that most such solutions of water-soluble polymers, separately, exhibit viscosity moderately higher than the viscosity of water alone. This viscosity, however, is not the thickening or viscosity-building effect of the present invention.

The two separate such aqueous polymer solutions are then combined. The combining is carried out by any convenient means whereby one aqueous solution may be contacted with another. When it is desired to utilize fully the dissolved solids of each of the two said solutions, and to prepare a homogeneous thickened preparation, the combining is carried out in such manner as to provide intimate contact between the two said solutions. This may readily be effected by intimately mixing and stirring the solutions together, preferably with relatively gentle mechanical action. The viscosity that is characteristic of the compositions of the present invention develops promptly after the mixing of the starting materials. Usually, an initial brief interval of low viscosity permits thorough mixing of the starting materials, if such mixing be done promptly. However, if such mixing be carried out violently, that is, with substantial shear, and past the time when the resulting viscosity has risen to its maximum, the resulting product appears to pass its peak viscosity and decline somewhat in viscosity.

One means of combining starting materials involves the comingling of streams which may be streams issuing from nozzles, whether as solid streams or finely dispersed sprays comprising minute droplets of each separate starting aqueous solution. They can also be natural water courses.

When the comingling of such sprays or other stirring procedure is carried out in gaseous atmospheres such as air, the resulting viscous product tends to entrap inclusions of such gaseous atmosphere. Therefore, when it is desired to prepare such heavy, viscous or near-solid medium without entrapped gas, combining of the starting materials may advantageously be carried out gently: or under atmospheres of reduced pressure or in the absence of gaseous atmosphere. When such gas content is desired, gas may be introduced under pressure to one or both starting materials or to the resulting product.

In an alternative method of preparation, a thin surficial deposit of one aqueous starting solution is first deposited from a fixed orifice upon the surface of a rotating drum and a similar thin deposit of a second such starting material is applied thereto at a point adjacent to the point at which the first such solution was so deposited and, as the drum rotates, it carries the resulting film of high viscosity past a blade or scraper whereby the resulting viscous vehicle deposit is removed.

In a general method of preparation in which it is possible to prepare all the vehicle compositions of the present invention, one of the two dissimilar aqueous starting solutions is poured, with prompt stirring, into a container containing the other of the two dissimilar starting solutions, such container having a capacity adequate to hold the combined result, stirring being continued long enough to effect complete dispersion of each such aqueous preparation in the other. This method is well adapted to be employed in the preparation of all the vehicles of the present invention of low to moderate viscosity and, without undue difficulty may be used in the preparation of even the most viscous vehicles of the present invention.

The starting material solutions of the sort described may also each be brought separately through hose, pipe, tube, or conduit to a junction or confluence at and beyond which mixing takes place or is caused, by induced turbulence, to take place, and the resulting viscous product is then further disposed in any desired manner.

The aqueous starting solutions may comprise pharmaceutical or cosmetic substances, chemically, biologically, or physically active substances, or stable aqueous dispersions of such substances in water-compatible form such as solutions in water-miscible solvent or dispersion in stable aqueous emulsion.

When one or both of the said aqueous polymer solutions comprises such active substance, the said substance becomes embodied in the resulting thickened or viscous preparation.

There is also prepared a composition of matter comprising the product resulting from the intimate mixing together in aqueous dispersion of an adduct of a polymeric vinylmorpholinone compound and a biologically active material with a polyalkenyl substance comprising recurring moieties selected from sulfo and carboxyl and salts thereof.

Although the uncombined starting solutions to be employed in the present method of preparing a viscous product of the present invention may be heated at any temperature over the liquid range of water, that is, between 0° C. and 100° C. without injury, the resulting viscous preparations tend to be somewhat heat sensitive. This heat sensitivity does not appear to exhibit sharply defined limits. Between about 0° C. and approximately 20° C., temperature changes have little or no effect upon the present viscous product. Between about 20° C. and about 50° C. increasing temperatures are accompanied by gradual decrease in viscosity, and the full original viscosity as measured at about 20° C. is largely recovered as the product is cooled. As the temperature of a viscous product of the present invention is increased gradually from about 50° C. to about 70° C., the viscosity further declines, but again most or all of it is recovered upon cooling. Similarly, as heating is continued to approximately the boiling temperature of water, viscosity of the present products further declines rapidly, but all, or almost all of the viscosity is recovered upon cooling. However, at temperatures only slightly lower than the boiling temperature of water, the present products yet retain a viscosity substantially higher than the average of the viscosities of the starting materials at the same temperatures. Exact numerical values for the such declining viscosities can be derived only in the instance of particular compositions and treatments, and vary according to factors not yet completely known. No quantitative means of predicting such thermal viscosity change in advance is now known.

Preparation of the present products is best carried out with both aqueous solutions at any temperature at the lower end of the temperature range at which the starting polymeric substances are conveniently dissolved in the desired starting concentration. Such temperatures usually are room temperature, about 24° C., or the temperature of industrial process feed-water, usually from about 7° to about 2° C. However, when it is desired to employ distilled or heat-sterilized water in the preparation of the starting aqueous solutions, aqueous still-condensate may be employed at any temperature at which it is conveniently collected, assuming the starting poymeric substance to be soluble in water at such temperature. The resulting hot solutions need not be cooled before continuing to prepare the present products.

The exact concentration of aqueous solution of starting polymeric substances depends upon various factors and may vary over a considerable range. When it is desired to prepare a vehicle of which the viscosity or "thickness" will develop precisely within narrow limits, it may be necessary, in any individual preparation, to carry out simple range-finding tests. Thus, the desired viscosity of the resulting product is a major factor in the determination of the concentration in aqueous solutions of the starting polymeric substances.

In a second general manner of practicing the present invention, a viscous product is prepared by dispersing in aqueous medium the essentially dry product resulting from the intimate mixing and blending together in finely-divided form of a water soluble polymeric 3-alkenyl morpholinone and a water-soluble polyalkenyl substance comprising recurring moieties which are members of the group consisting of sulfo and carboxyl and the salts thereof.

Numerous methods for effecting such mixing and blending are well known to those skilled in the art, one representative method being the use of a ball-mill.

In a typical manner of carrying out such preparation, the said polymeric substances are combined in the desired proportion, usually in the absence of liquid medium, and are then intimately mixed and blended together to effect uniformity of the resulting mixture.

Such uniform resulting mixture is then dispersed or dissolved in water to obtain a homogeneous uniform aqueous dispersion which promptly assumes the viscosity of the product of the present invention.

No theoretical explanation is known, for the viscosity increase of the present invention. Therefore, it is not at present possible to state precisely what proportions of the two solid components of the resulting viscous material represents the optimum of efficiency and economy.

Good results are obtained when employing amounts of the solid materials in which the number of recurring morpholinone moieties is equal with the number of recurring acid moieties; apparently equally good results are also obtained when employing equal actual weights of the two different kinds of substances, at least when each is a homopolymer. However, good results are obtained when employing the starting polymeric materials in very dissimilar amounts.

For example, when employing starting polymer solutions each in a concentration of ½ percent solid by weight of resulting solution, good thickening and a very substantial increase over the viscosity of the starting materials is obtained when employing a mixture comprising 1 part of sodium polystyrene sulfonate solution and 9 parts of polymeric N-vinylmorpholinone solution. Similarly, a mixture comprising 9 parts of sodium polystyrene sulfonate solution and 1 part of polymeric N-vinylmorpholinone gives a distinctly thickened resulting product.

When employing the said ½ weight percent solutions of the said starting materials, maximum thickening appears to be achieved when employing approximately 25 parts of polymeric N-vinylmorpholinone and approximately 75 parts of sodium polystyrene sulfonate solution. Such proportion is not, however, critical or essential for the practice of the present invention.

The viscosity of the resulting products of the present invention appears to be related in some way which is not fully understood to the concentration of the starting materials in aqueous dispersion. No particular amount or concentration or related ratio of amounts of concentrations of the polymeric substances in aqueous dispersion is known or believed to be essential or critical, but good results are obtained when employing starting solutions containing ten weight percent of each substance. The resulting products commonly achieve a viscosity so great as to be solids. When it is desired to prepare substances of considerably less viscosity, concentrations of one weight percent of each of the starting polymeric substances in water are usefully employed. The resulting products appear to be soft solids or near-solids.

When it is desired to prepare an aqueous composition of which the essential components are a mobile aqueous solution of a polymeric N-vinyl morpholinone and a polyalkenyl polymer upon which there are recurring moieties which are members of the group consisting of sulfo and carboxyl and salts thereof, having a viscosity greater than the mean of the separate viscosities of similar separate solutions of the said polymers, but yet a relatively low viscosity, concentration of solids as low as 5 one-hundredths of 1 percent of the resulting aqueous starting material solution may be employed.

Measurable and distinctive increases in viscosity over the sum of the viscosities of the starting substances are obtained when employing concentrations of the polymeric starting materials in water as low as one-hundredth percent by weight of resulting solution. It is believed after examination of many aqueous preparations, that if techniques for the precise measurement of viscosity were more refined than those presently available, concentrations as low as one one-thousandth weight percent would be found to give measurable and distinctive increases in at least some of the properties collectively called the viscosity of the mixtures resulting from the combination thereof. Such concentrations of the product of the present invention are found to modify the properties of aqueous media perceptibly.

Other factors are found to have effect upon the viscosity of the resulting preparation. One such factor is the degree of polymerization, that is to say, the molecular weight, of the starting polymeric substances. Polymeric starting substances of relatively high molecular weight appear to be especially useful. Thus, when employing, as polymeric substance of the acidic type, the salt of polystyrene sulfonic acid prepared by neutralization of the sulfonic acid moieties, or most of them, good results and great thickening are obtained when employing a sodium polystyrene sulfonate having an average molecular weight of about one million or higher. Such starting polymer, in aqueous solution in a concentration of about 2 percent by weight of the resulting solution, readily takes part in the preparation of firm gels, although such aqueous starting solution is relatively thin and watery. Similarly, sodium polystyrene sulfonate solutions of similar concentration prepared from a starting polymer salt of which the average molecular weight is about 800,000 also give rise to very firm vehicles. By the employment of lower concentrations or polymer of lower molecular weight, or both, it is possible to prepare vehicles having lower viscosity.

Average molecular weights of the morpholinone-substituted polymeric substance are desirably of at least the same general order, and, advantageously, higher. In terms of the K-value of Fikentscher, good results are obtained when employing polymers having K-values of from 20 to 70. Higher K-values are advantageous. However, no upper or lower limit molecular weight has been found to be critical.

It has elsewhere been discovered that at least some polymer compounds useful as the morpholinone member of the present viscous mixtures will form stable adducts with many substances. Such adducts are believed to be the subjects of patent applications to which the present inventor is not privy.

However, such adducts, as supplied to the present inventor by others, are employed and found to take part in forming the present vehicle materials of increased viscosity without disturbing the state of the adduct, or liberating any component thereof. It is thus determined that the state of the said heterocyclic polymer substance, whether combined in some kind of complex structure, or uncombined, is immaterial in the practice of the present invention.

In one embodiment of the present invention, the viscosity-building action and preparation of a vehicle according to the present invention is carried out in situ by separately applying, to the desired site, the necessary starting substances.

In the present specification and claims, "alkylene" is used to designate a bivalent saturated aliphatic hydrocarbon radical of which the valence bonds are attached to different carbon atoms. This is the commonly accepted meaning of the term.

In the present specification and claims, the expression "polyalkenyl" is used to designate a kind of polymer molecule and, by corollary, a representative portion of a polymer molecule resulting from the addition polymerization of monomeric moiety comprising an alkenyl group, when an alkenyl group is a polymerizable olefinic hydrocarbon compound having one ethylenic unsaturation and up to one monovalent substituent. The residue of such group after addition polymerization is a divalent or trivalent saturated aliphatic hydrocarbon group of which two valences are bonded to other such groups except when one is bonded to a chain-terminating group. These are the commonly accepted meanings of the terms.

In the present specification and claims, "sulfo" is used to designate the group (HO)SO₂—. This is the commonly accepted meaning of the term. Salts thereof, as herein referred to, are salts formed by displacement of the hydrogen or ionic association with the whole radical, with a basic substance. These are the commonly understood salts of such compounds.

In the present specification and claims, the expression "carboxyl" refers to a group C(O)OH; and a salt thereof as herein referred to is a salt formed by displacement of the hydrogen, or ionic association of the whole radical, by a basic substance. These are the commonly understood definitions of such substances.

In the present specification and claims the expression "an opaque reflective agent" is used to designate a substance which, as incident light impinges on it, transmits essentially none of the said light and reflects at least about 25 percent of it, when the term "light" is understood to comprehend radiations of wavelengths which can be from about 150,000 A. to about 1500 A., and thus comprehends infrared, visible, and ultraviolet light. Such opaque reflective agents are specifically inclusive of the opaque products defined in U.S. Patent 2,970,963; and also titanium oxide; metallic flakes, especially aluminum flakes; powdered calcium carbonate, and the like.

In the present specification and claims the expression "a surfactant" is used to designate a substance which, in an aqueous preparation that is the subject of the present invention, is useful for its cleansing, wetting, dispersing, or similar powers, in dilute aqueous solution. The term is expressly inclusive, herein, of the substances designated in U.S. Patent 2,547,724, columns 3 and 4.

The expression "a herbicide" is used in the present specification and claims to designate a substance not quickly destroyed on contact with water which is used, or is useful, to kill plant life. It is expressly inclusive of substances in U.S. Patent Office classification 71-2.2 and the subclasses indented thereunder.

In the present specification and claims the expression "a polymer" is used to designate a chemical compound or mixture of compounds formed by polymerization and consisting essentially of repeating structural units, and most typically, the such substances wherein there are, on an average, from 50 to 10,000 repeating units.

In the present specification and claims the expression "a polymeric 3-alkenyl morpholinone" is used to designate a compound that is a polymer in the sense hereinbefore defined and obtained by polymerizing a monomeric substance comprising essentially a monomeric

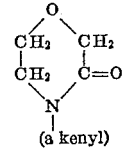

compound.

In the present specification and claims the expression "polyvinylmorpholinone" is used to designate a compound of the formula

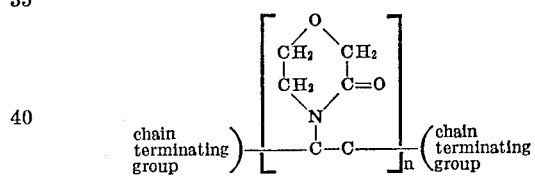

wherein $n$ is an integer, greater than 1, and typically of an average value of from about 50 to 10,000, and the chain terminating groups are chemical moieties of whatever nature, that terminate the chain: typically, moieties derived from polymerization initiators, catalytic substances, or impurities, such as water. The said compound is derived from the polymerization of 3-vinylmorpholinone,

In the definitions of polymers, the exact molecular weight and configuration are not stated, as is customary in well-settled polymer chemistry. See the article "Polymer" in "Cyclopedia of Chemical Technology" (Interscience Encyclopedia, New York) Volume 10, (1953) pages 957 and 958.

The following examples serve to illustrate certain methods of preparation, products and the processes embodying and utilities employing the present invention, but are not to be considered as limiting.

EXAMPLE 1

A sodium styrene-p-sulfonate monomer is polymerized in known manner to obtain a relatively pure sodium polystyrene-p-sulfonate having a mean molecular weight of approximately 800,000 as determined by a standard light-scattering method. This polymer is dissolved in water to prepare a colorless neutral slightly viscous solution containing 2.5 percent of polymeric material by weight of total solution. For convenience, this solution will in the present example be referred to as the sulfonate solution.

A 3-vinyl morpholinone polymer of which the molecular weight may be characterized by the K-value of about 60 according to the method of Fikentscher (See Cellulosechemie 13, 60 (1932),) as a fine powder, is dissolved in water to prepare a solution containing 2.5 percent of the said polymeric 3-vinyl morpholinone compound. This solution will hereinafter, for convenience, be referred to as the morpholinone solution.

Equal volumes of the sulfonate solution and the morpholinone solution are contacted together quickly, with stirring at room temperature to prepare a thickened vehicle of the present invention. The mixture promptly assumes a viscosity very much higher than the viscosity of either starting solution, becoming a soft semisolid.

The viscous mixture is disposed in the open filler ("bottom") end of an empty flexible dispensing tube which is then closed and sealed. The head of the tube, comprising a threaded neck to which a screw cap is affixed is exposed by unscrewing and removing the said cap and puncturing the head membrane. Through the puncture thus provided, the viscous product is readily expressed and applied as a viscous solid to surfaces upon which it is desired to effect such application. Upon being spread by application of pressure of an index finger the viscous vehicle forms an intact film or fluid membrane which appears to be uniformly continuous. Such film exhibits no tendency to flow, drip, or run under direct application of pressure intended to displace it; the film is strongly adhesive.

EXAMPLE 2

In the present example an aqueous solution of sodium polystyrene sulfonate is prepared identical with that employed in Example 1. As the polyalkenyl morpholinone polymeric aqueous solution there is employed an adduct of a biologically active material prepared as follows: a 3-vinylmorpholinone polymer having a molecular weight characterized by its K-value according to Fikentscher of about 60 is dissolved in a solution of 4 grams of iodine in a mixture of 20 milliliters methylene chloride and 500 milliliters of carbon tetrachloride. The resulting dispersion is agitated at room temperature for 18 hours and thereafter the solid component is removed by filtration and washed repeatedly with carbon tetrachloride and with diethylether and then maintained at a temperature of 40° C. under subatmospheric pressure for approximately 18 hours to remove traces of solvent and achieve equilibrium dispersion of the halogen. The resulting solid adduct substance contains a substantial proportion of bound iodine. It is dissolved in water to prepare a solution containing 2.5 percent of the halogen-polymer adduct substance by weight of resulting aqueous solution. For convenience, this solution will, in the present example, be identified as the iodine-polymer solution. Equal volumes of the sulfonate solution and the iodine-polymer solution are intimately mixed and blended together with stirring at room temperature. The mixture promptly becomes homogeneous and of a viscosity very much higher than the viscosity of either starting solution, achieving a viscosity apparently as great as that described for the product of Example 1.

The viscous mixture is placed in the open end of an empty flexible dispensing tube as was the product of Example 1. The tube is then closed and sealed and in procedures such as were outlined in Example 1, the resulting viscous iodine-bearing solution is applied to localized areas of human skin. Upon being spread by the application of pressure of a forefinger, the viscous iodine-vehicle material forms an intact film or fluid membrane of uniform and continuous nature having no observable tendency to flow, drip or run. It is not completely removed by the direct application of finger pressure intended to try to remove it. The product prepared in this example contains about 0.125 percent of iodine in total formulation corresponding to 5 percent iodine by weight of total solids. The product is found to be strongly germicidal.

EXAMPLE 3

The present example is carried out in all respects as is Example 2 except that the employed aqueous solutions of the starting polymeric substances contain 1 percent by weight of resulting solution of each of the polymeric materials. Each of the said polymeric starting solutions has a viscosity only slightly higher than that of water. However, the vehicle resulting when the said solutions are combined is of the viscosity of a thick salve. When introduced into and dispensed from a plastic dispensing tube in the manner hereinbefore described, this product, applied to and spread over a surface area with the resulting formation of a film, has no observable tendency to run, drip or flow.

EXAMPLE 4

The present example is caried out in all respects as is Example 1 except that, instead of a sodium polystyrene sulfonate solution there is employed an ammonium polystyrene sulfonate solution containing approximately 14 percent ammonia in incombined form in the resulting aqueous solution. This maybe understood to be a 2.5 weight percent solution of ammonium polystyrene sulfonate in aqueous ammonia. A portion of such starting solution is set aside for comparison purposes. A further portion is combined with an equal volume of polyvinyl morpholinone solution as hereinbefore described. Upon the combining of the polymeric sulfonate and morpholinone solutions, thickening promptly takes place with the result that there is prepared an extremely viscous, semisolid, essentially fluid preparation of ammonia. A portion of such solid is set aside for comparison with the aforementioned sample of the ammonium polystyrene sulfonate solution in aqueous ammonia. The preparations are covered and maintained at room temperature and periodically tested for escape of ammonia and for remaining ammonia content. At the end of 72 hours, the simple ammonium polystyrene sulfonate solution in aqueous ammonia is found to have lost most of its ammonia content. In contrast, the thickened ammonia gel of the present invention is found, at the end of 72 hours, to have a content of ammonia not much less than the starting concentration. The gelled ammonia product of the present example is useful in application wherein aqueous ammonia is called for, with the improvement that the present composition maybe handled as a solid.

A similar preparation is prepared comprising aqueous ammonia in 5 percent concentration; and is found to be similarly stable.

EXAMPLE 5

In manner essentially similar to the foregoing example there is prepared a gel comprising aqueous sodium polystyrene sulfonate and aqueous polymeric N-vinylmorpholinone together with one percent by weight of resulting product of sodium hydroxide. The resulting viscous material has a pH substantially above 9, and is adapted to be employed as a cosmetic adjuvant for topical application to human fingernails for the softening of cuticle preparatory to its cosmetic removal.

EXAMPLE 6

A hose comprising two parallel laterally joined flexible tubes is provided with a nozzle whereby the contents of the tubes are intimately contacted together at the last instant of their traverse of the tubing and prior to issuing from the said nozzle. Through one tube is supplied a one weight percent aqueous solution of sodium polystyrene sulfonate and through the other tube is supplied an aqueous solution of a water-soluble polymeric alkenyl-substituted morpholinone, in the present example an aqueous one weight percent 3-vinylmorpholinone. Each of the two liquid supplies, of very low viscosity, contains, as opacifier, a small amount of titanium dioxide. The solutions flow freely through their respective tubes; upon mixing in the said nozzle, the resulting composite solution promptly assumes the greatly increased viscosity characteristic of the products of the present invention, being in effect, water of greatly increased viscosity and adhesivity. The liquid issuing from the said nozzle is directed at a fire which is destroying a wooden structure. The resulting viscous, opacified water material readily adheres to the wooden structure and tends to build up a cooling, reflective deposit of substantial depth. As a result of these operations, the fire is not only superficially extinguished, but confined, superheated areas of combustible substances are cooled by the resulting deposit of jelled water substance, assisted by the presence of the opacifier, thus obviating the need, often noted in professional extinction of damaging fires, to continue to cause a flowing stream of water to contact the remaining portions of the wooden structure. Thus the present product is of special value in fire fighting with restricted water supplies, or where flooding from excessive use of water is to be avoided.

In another embodiment of the instant aspect of the present invention, the said nozzle is elongated and provided with means for the introduction into the polymer solution stream, subsequent to the mixing of the said solutions, of compressed gas. In the instant examples the gas is compressed carbon dioxide. The judicious selection of rate of gas introduction with respect to viscosity of the resulting product makes possible the production of a foam comprising the present jelled water substance with abundant included bubbles of inert gas.

EXAMPLE 7

There is provided a herbicidal solution containing, as a principal active ingredient, the alkanolamine salts of the ethanol and isopropanol series of 2,4-dinitro-o-secondary butylphenol. To the aqueous solution of the said herbicidal substance there is added one percent by weight of resulting solution of polymeric 3-vinylmorpholinone the said polymer having a molecular aggregation as represented by the K-number according to Fikentscher of 60.

There is provided a second solution comprising one and one half percent by weight of resulting solution of sodium polystyrene sulfonate. Each of the said solutions is placed in a separate tank in a sprayer designed to apply compressed air pressure to the contents of both tanks simultaneously, means for the control of the issue of each such liquid from its container, and a nozzle wherein the two solutions are mixed together at the last instant before leaving the said apparatus.

Compressed air pressure is applied, the nozzle is directed toward vegetation which it is desired to kill, and the control means are operated to permit the two solutions to issue from their containers, mixing at the last instant while yet remaining in the equipment, to prepare a heavy, yellow, clinging, viscous aqueous dispersion of the said herbicide in a jelled preparation according to the present invention. The resulting viscous substance clings to the above-ground parts of the plants upon which the preparation is caused to be deposited. As a result of these operations, there is applied a deposit of herbicidal toxicant having effect upon the plant of longer persistence and, on an average of a large number of plants, more complete kill. In a related process, separate solutions of 0.1 weight percent of two gelling substances are employed, and the herbicide is an ester of 2,4-dichlorophenoxyacetic acid. The viscosity increase is achieved prior to application. The resulting syrupy liquid preparation has a viscosity of about 1000 centipoises, Brookfield.

The viscous preparation is readily applied to a test area from a compressed air sprayer. The applied substance is virtually free from airborne random particles and thus does not cause "drift" injury to adjacent areas.

EXAMPLE 8

In a soil conservation district comprising approximately 600,000 acres disposed over the headwaters of a small stream there are, as principal watershed of such stream, 12 farms upon the land of each of which there is a catchment. The said catchments are used by the operators of the said farms as ponds for watering livestock, for recreational swimming and fishing, and for other uses. In seasons of acute rainfall, the catchments customarily fill to overflow and thus contribute, to the small stream about whose head waters they are disposed, water in volume greater than lower reaches of the bed the stream can readily accommodate; with the result that portions of the stream and its environs are subject to sudden, brief, damaging floods.

Into each of six of the said catchments there is introduced sodium polystyrene sulfonate. Into each of the remaining six there is introduced 3-vinylmorpholinone. The said substances are introduced into the catchments at rates corresponding to approximately one tenth of one percent by weight of water. No individual catchment is seriously affected by the introduction of one of the relatively inert substances in small amounts. However, upon the occurrence of a short, sharp rainfall as the catchments overflow and their waters commingle in the said small stream, the resulting mixed solution of the two substances becomes of greatly increased viscosity with the result that, while it flows through the stream bed, such flow is of greatly reduced rate, and flooding does not occur. As the rainfall continues, and further flow of water takes place, the water of increased viscosity is greatly diluted and carried downstream so that, a few miles below the site where the flooding was prevented no further evidence of the preventive means appears.

EXAMPLE 9

A polymeric N-vinylmorpholinone having a K-value according to Fikentscher of 30 is dissolved in water to obtain a colorless solution thereof containing 5 percent by weight of resulting solution of the said polymer.

A second solution is prepared, comprising a copolymer of vinyl acetate and maleic acid.

Equal portions of 5 weight percent solutions of the copolymer of vinyl acetate and maleic anhydride and the polymeric vinylmorpholinone in water are mixed together. The resulting mixed solution, comprising 2.5 weight percent of total resulting solution of each of the said components is immediately intimately mixed and stirred. Thereupon, the viscosity of the resulting mixture promptly increases. The resulting viscosity is found to be approximately five times the sum of the viscosities of the separate solutions of compounds.

EXAMPLE 10

A 1 percent aqueous solution of polymeric N-vinylmorpholinone is intimately mixed and blended with a 1 percent aqueous solution of a commercial flocculant which is a polyacrylamide partially hydrolyzed after polymerization to obtain a substantial fraction of acidic moieties on the polymer chain. The two said solutions are combined with mixing and stirring and promptly thereupon the resulting mixture undergoes a great increase in viscosity.

EXAMPLE 11

Two aqueous 1 percent by weight solutions are prepared, one containing polymeric N-vinylmorpholinone having a K-value according to Fikentscher of 80. The other contains a copolymer of styrene and maleic anhydride hydrolyzed subsequent to polymerization to obtain a polymer upon which there are recurring carboxyl radicals attached to the hydrocarbon chain. The resulting hydrolyzed polymer is thereafter neutralized with sodium hydroxide to obtain a sodium salt of the carboxyl groups. Each of the separate solutions is colorless, bland, and of a viscosity not apparently much greater than that of water.

The two solutions are combined with immediate mixing and stirring, and promptly thereupon the resulting mixture increases in viscosity to become a firm gel.

EXAMPLE 12

Two aqueous 1 weight percent solutions are prepared. One of the said solutions contains polymeric 3-vinylmorpholinone having a K-value according to Fikentscher of approximately 70. The other contains a commercial polymeric material, essentially a polymer of styrene sulfonated subsequent to polymerization to introduce thereinto primarily upon the aromatic neclei thereof, sulfonate groups corresponding in number to approximately 70 percent of the aromatic nuclei. The resulting substance is strongly acidic and is of limited solubility in water. Each of the said solutions is colorless, and of a viscosity apparently only slightly greater than that of water.

The two solutions are mixed and quickly stirred together, whereupon there promptly forms a very viscous gel.

EXAMPLE 13

A viscous product according to Example 1 is prepared, spread in a thin layer on a glass surface, and placed in a vacuum oven wherein it is exposed for a period of time to a temperature of approximately 40° C. and gradually declining subatmospheric pressures. The said pressure and temperature conditions are maintained for a period of time to vaporize and remove water from the said vehicle substance. The resulting dry material is scraped from the surface whereupon it is dried, and, by simple crushing reduced to an amorphous irregular powdered material. This powdered material is then placed in a capped glass container and held in storage for a period of several months.

At the end of this time, the substance is removed from its container, dispersed in water, of amount approximately equal to the amount originally employed in preparation of the product. As a result of these operations there is obtained a reconstituted viscous material, the viscosity of which is nearly as great as the original viscosity of the vehicle prepared prior to drying.

The resulting reconstituted viscous material is thereafter again dried and again reduced to a white solid which is subsequently powdered and again placed in storage. After several weeks in such storage the powdered material is again reconstituted with essentially the same amount of water and upon examination is found to possess viscosity much greater than the original viscosity of the separate starting polymeric solutions from which the original product is prepared, but somewhat lower than that of the gel prior to its first dehydration.

EXAMPLE 14

A viscous material similar to the product of Example 1 is prepared, differing in that the starting polymeric vinylmorpholinone has a greater molecular weight corresponding to a K-value according to Fikentscher of approximately 80. The resulting gel is sufficiently firm that it does not flow from a container confining it, when the container is inverted.

The resulting gel is placed in the container of a high speed impeller-type mixing device ("Waring Blendor") and subjected to high-speed shear mixing. The speed of the impeller is greatly reduced as compared with its speed when operating in water. Continued operation of the impeller results in a gradual decline in the viscosity of the viscous preparation. After 5 minutes of operation, the temperature of the viscous preparation thus agitated is noted, and is found to have risen, as a result of the mixing and blending action, from an initial temperature of approximately 22° C. to a temperature of approximately 80° C. This is interpreted as a manifestation of the inner resistance of the viscous material to the shearing action of the mixing device. The viscosity of the material increases as the temperature of the product declines to room temperature.

EXAMPLE 15

Equal weights of polymeric N-vinylmorpholinone and sodium polystyrene sulfonate of the sort employed in Example 1 are mixed and blended together dry. The resulting dry mixture is thereafter taken up in water to obtain an approximately 1 weight percent solution of each of the said starting materials. Immediately upon the combining of the dry mixture with water, there results an increase in viscosity, and the preparation of a material much more viscous than would have been an aqueous solution of either starting material alone.

The viscous preparation is placed in storage and held therein for 18 hours. At the end of this time, the preparation is examined and found to be of viscosity substantially lower than that of the same preparation at the end of its initial viscosity increase.

EXAMPLE 16

Polymeric N-vinylmorpholinone having a molecular weight corresponding to the K-value of Fikentscher of 60 is dissolved in water to prepare a solution containing 2.5 percent by weight of the said polymer. Into the resulting solution there is dispersed an amount of sodium phenate equimolecular with the recurring vinylmorpholinone units of the said polymer. The sodium phenate disappears apparently by dissolving, and therewith the odor of phenol disappears also. The resulting solution, comprising an adduct of some kind, of the sodium phenate with the said polymer, is germicidal and innocuous upon contact with tissues of warm-blooded animals. It is strongly germicidal. However its germicidal use is handicapped by its relatively low viscosity. It is desired to prepare a much more viscous product comprising such adduct.

To the said adduct solution there is added a second solution comprising an amount of sodium polystyrene sulfonate of weight equal to the weight of the starting oxazolidinone polymeric material. Immediately upon the combination of the two said solutions, they are intimately mixed and blended by prompt, vigorous stirring. The resulting mixed solution immediately increases very greatly in viscosity to obtain a highly viscous gel.

An infrared spectrum scan of the adduct of polymeric 3-vinylmorpholinone and sodium phenate indicates a significant displacement and other modifications of the spectral bands deriving from the carbonyl group of the morpholinone material and from the phenate radical. This disturbance of the spectrum indicates that the said adduct represents a significant chemical modification of each starting material. The gel product of the present example is similarly examined by infrared-scan and also exhibits the said displacements, indicating that the formation of the present gel does not disturb nor apparently involve the mechanism of the formation of such adducts.

The gelled product of the present example is tested in standard microbiological techniques and found to be strongly germicidal.

EXAMPLE 17

A definitive test is set up to ascertain whether the thickening which is characteristic of the present invention does or does not disturb adducts of water solutions of alkenyl substituted morpholinone polymers with ionized substances. It is recognized that one representative material, aqueous solution of which are readily and reliably thickened by the addition of aqueous solutions of such alkenyl morpholinone polymers is the sodium salt of polymeric styrene-p-sulfonate. It is reasoned that if the thickening according to the present invention arises by reason of formation of an adduct in a mechanism similar to that wherewith other adducts of the sort described are formed, then an aromatic sulfonate adduct of the said alkenyl morpholinone polymer, having no further capacity to combine with such sulfonate groups, should be incapable of forming further adduct with a polystyrene sulfonate, according to the present invention.

Such adduct is prepared by the combination, in aqueous solution, of polymeric 3-vinylmorpholinone and benzene sulfonic acid in amounts equimolecular upon the basis of the recurring vinylmorpholinone units in the polymer, and the benzene sulfonic acid molecule. Both substances are readily and promptly soluble. Examination of the spectrum derived by infrared scan of the starting materials and the resulting adduct indicates a displacement corresponding to a major modification of the sulfonic acid portion of benzene sulfonic acid and of the carbonyl group of the morpholinone ring. The spectrum fails to disclose the presence of free benzene sulfonic acid.

To the aqueous solution of such adduct there is added an equal weight of polystyrene sulfonic acid also in aqueous solution. The two solutions were immediately intimately mixed and stirred, and promptly thereafter the resulting mixed solution increased greatly in viscosity, and formed a firm gel. The examination of the resulting gel, in various systems of analysis, fails to disclose the presence therein of uncombined nonpolymeric benzene sulfonic acid. The sulfonic acid moieties of the polystyrene sulfonic acid appear to be present in essentially unmodified form.

EXAMPLE 18

Polymeric N-vinylmorpholinone having a macromolecular weight corresponding to a K-value of Fikentscher of 63.5 is dissolved in natural seawater representative of the waters of the high seas to prepare a solution containing 1 percent of the said polymeric substance by weight of resulting seawater solution. Similarly, a solution is prepared comprising 1 percent of sodium polystyrene sulfonate by weight of resulting sea-water solution. The two solutions, at room temperature (approximately 24° C.) are then poured together and intimately mixed by manual stirring. The resulting mixture promptly increases in viscosity, the viscosity increasing as stirring is continued for a period of a few minutes.

EXAMPLE 19

The present example is similar to the foregoing in that the aquous medium employed in sea water, and the polymeric starting materials are the same, but the preparation is carried out in a different manner.

Equal weights of sodium polystyrene sulfonate having a molecular weight of approximately 150,000 and polymeric N-vinylmorpholinone having a macromolecular weight corresponding to a K-value of Fikentscher of about 63.5 are intimately mixed and blended together and thereafter, in the dry form, placed together in a ball mill where they are commingled for a period of about 5 hours to reduce the resulting product to a fine powder and provide intimate mixing of the starting polymeric substances.

The resulting impalable powder is strewed gently on the upper surface of a body of sea water. Coarser particles of the powdered material promptly break through the surface tension of the water and thereafter settle through the water towards the bottom. All the particles, including those settling, appear to disperse in the water to prepare a heavy viscous jelly-like substance in the form of an aqueous dispersion of the said starting materials. Settling particles of the said mixed powdered material appear to disperse in the water with the resulting formation of gel as they settle, producing descending threads or pendant structures of such gel in otherwise unaffected portions of sea-water beneath a surface gelled zone.

The resulting aqueous preparation is not stirred, a deliberate effort being made to observe the spontaneous behavior of the said solid substance in sea water.

Examination of the walls and bottom of the vessel within which the said sea water is confined, discloses the presence, as a more-or-less continuous lining of said walls and a more-or-less continuous layer across said bottom of a dense viscous preparation according to the present invention, such viscous preparation thus comprising nearly an intact cell containing relatively unaffected sea water.

The amount of such powered solution employed in the present example is not measured precisely, but is approximately equal to one-quarter weight percent of sea water thus treated.

EXAMPLE 20

Aqueous solutions of sodium polystyrene sulfonate having an average molecular weight of approximately 1,500,000 and of N-isopropenylmorpholinone having a molecular aggregation corresponding to the K-value of Fikentscher of 72.4 are prepared at a concentration of 0.5 percent by weight of total solution of each solute.

Portions of separate solutions are intimately mixed and blended together with stirring to obtain a viscosity-increasing preparation of the present invention. The resulting product increases promptly and dramatically in viscosity. After approximately 1 minute of such mixing, the Brookfield viscosity of the resulting preparation is determined and is found to be greater than 10,000 centipoises.

A mixture of the said solutions is prepared employing 150 parts by volume of the sulfonated solution and 100 parts by volume of the morpholinone solution. The two solutions are intimately mixed and blended together with stirring whereupon there takes place a conspicuous increase in viscosity, more noticeable to a trained observer than measurable.

The compositions and products of the present invention are used successfully to increase the viscosity of strong mineral acids as is indicated in the following examples.

EXAMPLE 21

Dry granular sodium polystyrene sulfonate is dispersed in liquid concentrated sulfuric acid. After prolonged stirring it is determined that the substance is incompletely soluble in the said acid. Therefore, with necessary precautions in view of the unusual procedure, a small amount of water is added drop-wise and with continous stirring to the dispersion of sodium polystyrene sulfonate in sulfuric acid, employing only enough water to permit dissolving the said sulfonate compound. The precise acid concentration at which the sulfonate entirely dissolved is not ascertained but is roughly estimated to be between 60 and 75 percent $H_2SO_4$. In similar procedure a solution of 3-vinylmorpholinone in sulfuric acid is prepared. Each of the said solutions is of a viscosity determined principally by the concentration of sulfuric acid; fluid and easily poured but moderately thicker than water.

The two separate sulfuric acid solutions are then combined with mixing and stirring. The viscosity of the resulting preparations promptly increases, such increase continuing over a period of time until the resulting preparation is a soft, deformable solid which can be lifted bodily, on the employed glass stirring rod from the container in which the mixing is carried out. The product is tested and found to be active as an acid in the same degree as a corresponding aqueous sulfuric acid except that, because internal flow is obstructed, superficial portions of the acid first become exhausted and thereafter it is necessary to deform the body comprising the acid to render further portions of acid available.

EXAMPLE 22

The present example is carried out in all respects as is Example 21, foregoing, except that the employed acid is phosphoric acid. The results obtained are essentially the same, the resulting preparation being of viscosity so great that it can be lifted bodily on a stirring rod.

The utilities of the novel viscosity-building substances of the present invention are in part set forth hereinbefore. The present invention is found to have many other uses. Among these are the increasing of the viscosity with corollary reduction of vapor pressure of aqueous ammonia solutions which are thereby rendered useful for airplane application as fertilizers of the soil for agricultural purposes. The use of aqueous ammonia in this way is well known but its airplane application has been impractical because the ammonia escapes as a gas from its aqueous solutions when such solutions are sprayed or otherwise ejected from an airplane into the air above a field to which application is desired. A thickened aqueous product which may be ejected in droplets or as solid fragments overcomes this difficulty. The preparation is deemed to be especially appropriate in the application of ammonia as fertilizer to fallow ground or to shallow water in which aquatic or semi-aquatic vegetation such as rice, is to be grown.

Also, a thickened aqueous ammonia of which the viscosity is increased to any desired level has numerous household and industrial applications as a cleansing agent. The adhering of the thickened preparation to the surface to be cleansed is greatly helped by the preparations of the present invention.

Similarly, sulfuric, phosphoric, and acetic acids which are widely used in industry as "pickling" or metal-surface-cleansing agents may be thickened in the manner of the present invention to viscosity of any desired degree thereby considerably enhancing their usefulness in many cleansing applications.

Prior to its hardening, a phenomenon which is generally believed to involve hydration, Portland cement is essentially an aqueous slurry having many of the properties of a liquid. When it is desired to confer upon such slurry the physical properties of a semi-solid or to increase the viscosity of such cement to inhibit its flow or deformation under the influence of gravity, the viscosity-increasing phenomenon of the present invention is usefully employed.

Such toilet articles as after-shave lotion, cologne water, perfumes, shampoo, liquids and the like having appreciable content of lower alkanols, glycols, glycerine and the like, may be given increased viscosity with resulting increased adherence to surfaces to which they are applied in the manner of the present invention.

The aqueous slurries of natural earths employed in the well-drilling art, particularly the oil-well drilling art, may be caused to have increased viscosity and resulting increased usefulness by the preparations of the present invention.

In the industrial production of surfactant substances in bar form for domestic use, one problem has consistently been the tendency of such bars comprising synthetic detergents, when in contact with water, to swell, disperse, and "slough off." Another problem has been that detergent bars, while effective as sources of cleansing detergents, do not exhiibt the lubricity when moist, that is to say the "slipperiness," which is commonly associated with the power to cleanse. Both these problems are simultaneously overcome by the inclusion, in a detergent bar, of a viscosity-increasing composition of the present invention. Meantime, such preparation does not interfere with the desired detergent action of such substance.

Numerous aqueous window-cleaning preparations are on the market. These preparations uniformly suffer the disadvantage that when it is desired to apply a quantity thereof sufficient to soften and remove substantial accumulations of soil from glass or window surfaces, the aqueous preparations run off in the manner of liquids.

These preparations, thickened in the manner of the present invention do not run off. Moreover, the present viscosity building agents do not interfere with the cleansing action of such substances but rather appear to contribute to the resulting brillance and clarity of the cleansed surface.

In another application, one of the present aqueous starting materials may be applied to one of two surfaces which are to be joined; the other may be applied to the second such surface. The surfaces are then brought together with gentle pressure, whereby the present viscous materials form and the surfaces are caused thereby to adhere together.

I claim:

1. A composition of matter comprising, in aqueous dispersion, the product resulting from the contacting of a water-soluble polymer comprising recurring N-vinyl morpholinone and a water-soluble polyalkenyl polymer comprising a polyethylene chain and, thereupon, recurring members of the group consisting of sulfo and carboxyl and salts thereof; said composition being of greater viscosity than the mean of the separate viscosities of the said polymers in separate similar dispersion.

2. A composition of matter comprising, in aqueous dispersion, the product resulting from the contacting of a water-soluble polymeric N-vinyl morpholinone with a water-soluble polyalkenyl polymer comprising recurring members of the group consisting of sulfo and carboxyl and the salts thereof, said composition being of greater viscosity than the mean of the separate viscosities of the said polymers in separate similar dispersion.

3. A composition of matter comprising, in aqueous dispersion, the product resulting from the contacting of a water-soluble poly-N-vinyl morpholinone and a water-soluble polyalkenyl substance upon the polymer chain of which there appear recurring moieties which are members of the group consisting of sulfo and carboxyl and the salts thereof, said composition being of greater viscosity than the mean of the viscosities of the starting materials in similar dispersion.

4. A composition of matter comprising in aqueous dispersion, the product resulting from the intimate mixing together in finely divided form in the absence of liquid medium of a water-soluble polymeric N-vinylmorpholinone compound and a water-soluble polyalkenyl substance upon the polymer chain of which there are recurring moieties comprising members of the group consisting of sulfo and carboxyl and salts thereof, said dispersion being of a greater viscosity than the mean of the viscosities of the starting materials in similar dispersion.

5. A composition of matter comprising the product resulting from the successive steps of (1) contacting of a water-soluble poly-N-vinyl morpholinone with a water-soluble polyalkenyl polymer upon the polymer chain of which there are recurring moieties comprising members of the group consisting of sulfo and carboxyl and the salts thereof, said contacting being carried out with both said polymeric substances in aqueous solution, the resulting composition being characterized by having a viscosity greater than the viscosity of any of its starting materials and (2) subjecting the resulting product to evaporative removal of water.

6. Composition of claim 5, wherein the water-free product is again dispersed in water.

7. Composition of matter comprising the product resulting from the mixing together of sodium polystyrene sulfonate, concentrated sulfuric acid, and a polymer comprising recurring N-vinylmorpholinone moieties together with not more than a minor content of water, such composition being characterized by having a viscosity greater than the viscosity of any of its starting materials.

8. A composition of matter comprising, in aqueous dispersion, the product resulting from the contacting of an aqueous solution of 2.5 percent water soluble polymeric 3-vinyl morpholinone of which the molecular weight is represented by a Fikentscher K-value of about 60, by weight of aqueous solution, with a 2.5 percent aqueous solution of a water soluble sodium styrene-p-sulfonate polymer of mean molecular weight of approximately 800,000, by weight of aqueous solution.

9. Composition of matter comprising the product resulting from the mixing together of sodium polystyrene sulfonate, phosphoric acid, and a polymer comprising recurring N-vinylmorpholinone moieties together with not more than a minor content of water, such composition being characterized by having a viscosity greater than the viscosity of any of its starting materials.

References Cited

UNITED STATES PATENTS

| | | | |
|---|---|---|---|
| 2,723,248 | 11/1955 | Wright | 260—895 |
| 2,901,457 | 8/1959 | Stoner et al. | 260—873 |
| 2,931,694 | 4/1960 | Wirth et al. | 260—895 |
| 3,061,569 | 10/1962 | Stoner et al. | 260—895 |

SAMUEL H. BLECH, *Primary Examiner.*

W. J. BRIGGS, Sr., *Assistant Examiner.*

U.S. Cl. X.R.

61—1; 71—79, 121, 122, 125; 260—41, 895; 252—2, 152; 424—61, 78, 150